UNITED STATES PATENT OFFICE.

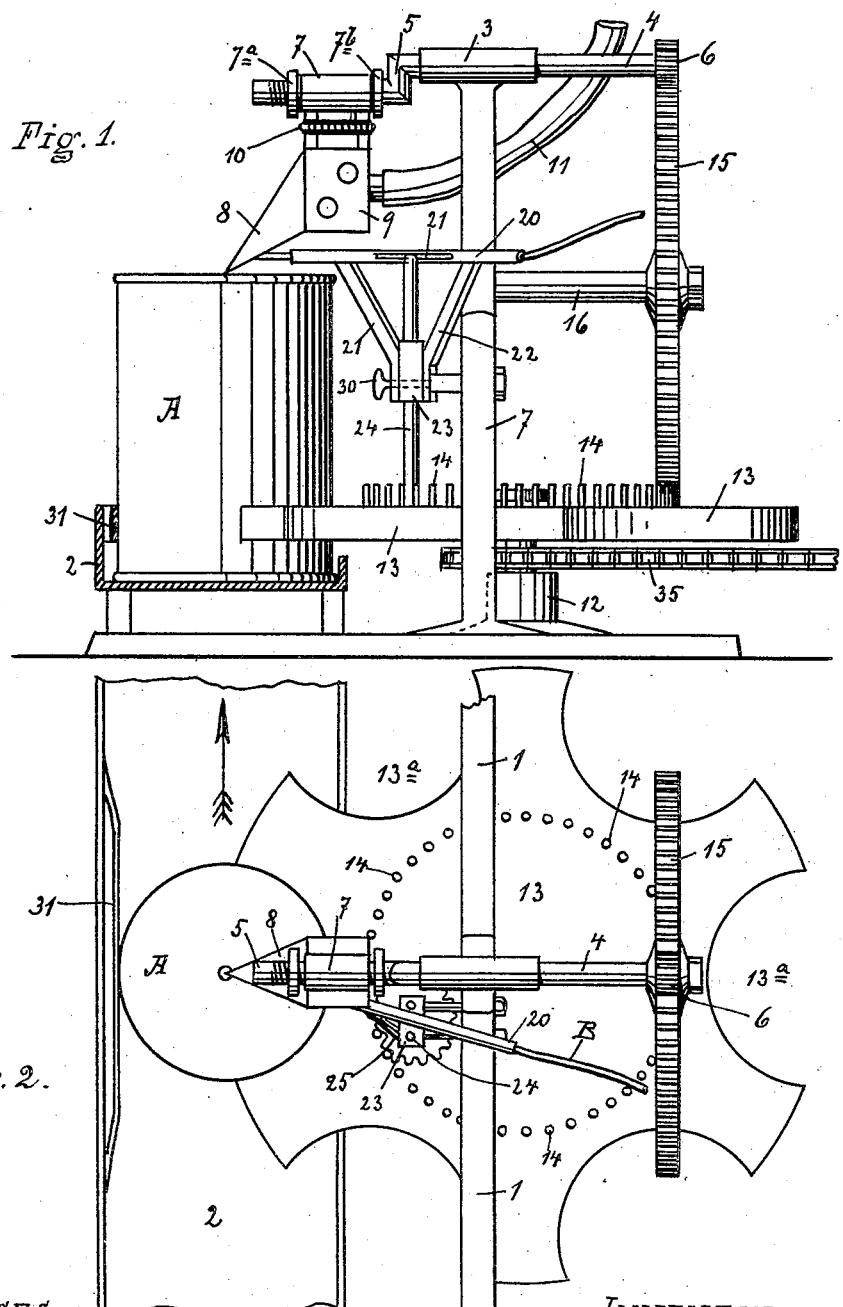

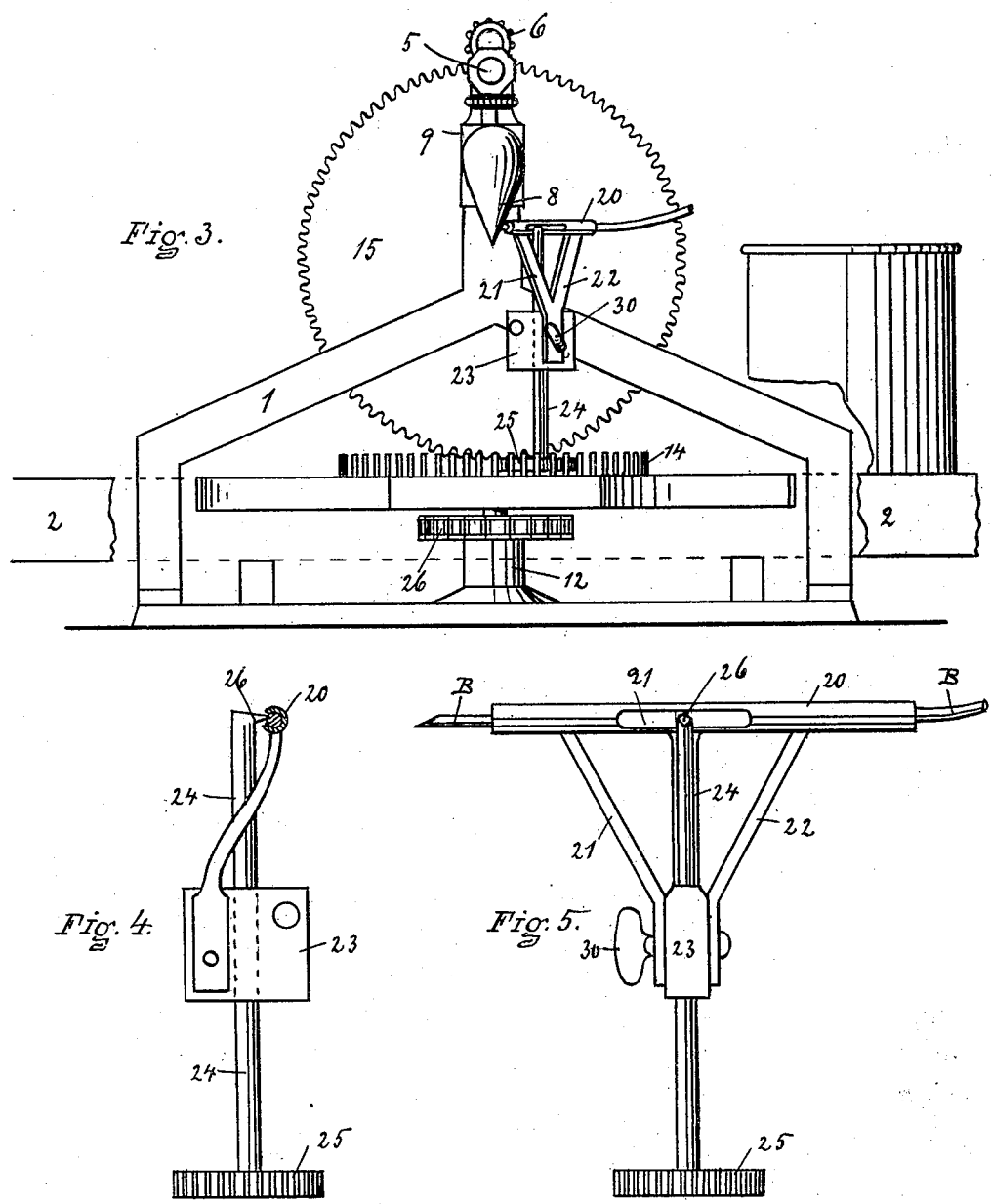

CHARLES ARTHUR CRANDALL, OF VERONA, NEW YORK.

CAN-VENT-SOLDERING MACHINE.

No. 886,767.

Specification of Letters Patent.

Patented May 5, 1908.

Application filed May 2, 1906. Serial No. 314,912.

*To all whom it may concern:*

Be it known that I, CHARLES ARTHUR CRANDALL, a resident of Verona, in the county of Oneida and State of New York, have invented certain new and useful Improvements in Can-Vent-Soldering Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my invention is to provide a soldering machine for closing the vent openings in cans after the same have been filled with fruit, vegetables or other substance.

Figure 1 shows a side elevation of a machine of my improved construction. Fig. 2 shows a plan view of the same. Fig. 3 is a side elevation mainly as seen from the left of Fig. 1. Figs. 4 and 5 relate to details of the solder feeding mechanism.

Referring to the reference letters and figures in a more particular description, 1 indicates a frame mounted on a suitable base, which base also supports a trough 2 through which the cans to be operated upon are moved. The frame 1 carries in its upper portion in a bearing 3 the shaft 4, which is provided at one end with a crank 5 and at the other end with a gear wheel 6. On the crank 5 is arranged a sleeve or bearing 7, from which is suspended the soldering iron 8 with its heater 9. There is preferably interposed between the bearing sleeve 7 and the heater and soldering iron an asbestos or similar packing 10, which protects the bearing against absorption of heat from the heater and soldering iron. Gas may be supplied to the heater 9 through a flexible tube 11. Mounted in an upright bearing 12 on the base is the can passing wheel 13. This can passing wheel as to one edge projects partially over the can trough 2 and is provided in its edge with a number of substantially semi-circular recesses 13ª to receive and hold the can. There is provided in the upper surface of the wheel 13 a circular row of pins 14, which mesh with the cog teeth of the transmitting wheel 15 and through the medium of the transmitting wheel and the gear pinion 6 meshing therewith drives the solder iron shaft 4. The wheel 15 is mounted on a fixed shaft or bearing 16 provided in the frame 1. The carrying wheel 13 is driven by means of a sprocket chain 35 running on a sprocket wheel 26 immediately under the carrying wheel, although this particular mode of driving is not material as the machine might be driven from several other available points.

The solder B which is supplied to the machine in wire form is directed against the iron 8 by a tube 20 through which it passes. This tube is supported by arms 21—22 from a bearing box 23, which carries the shaft 24. The shaft 24 is provided at its lower end with a gear pinion 25 meshing with the row of pins 14 before mentioned, and is provided at its upper end with a laterally extending point 26 adapted to dig into the wire of solder and move it along through the tube 20 as the shaft 24 rotates.

To allow the point or tooth 26 to reach solder in the tube and afford clearance therefor, there is provided in the middle portion of the tube 20 a slot 21. When not being moved forward by the point 26, the solder will be held by friction in the tube 20. In order to vary the quantity of solder fed with each revolution of the point 26, the base of the arms 21 and 22 are adjustably secured to the bearing box 23 by a thumb screw 30. By loosening this screw, the tube 20 can be moved laterally towards or from the axis of the shaft 24 and, of course, it is apparent that when moved close up to the axis the point 26 will strike into the solder wire at an earlier point in the revolution and leave it at a later one, whereby more solder will be fed forward with each revolution; whereas, when the tube 20 is moved away from the axis of the shaft 24, the reverse is the case.

The cans will be brought up to a position approximate the mechanism shown herein by suitable carriers, such as are well known in connection with this class of machines. The machine herein shown being put in operation, as the passing wheel 13 moves around, it engages a can A in one of the semi-circular depressions 13ª and starts to move it along the trough 2 in the direction indicated by the arrow in Fig. 2. In order to hold the can A in true position with reference to the passing wheel 13, there will preferably be provided a holding spring 31 which will bear against the side of the can and press it into the depression in the passing wheel. The mechanism is so timed that when the can A reaches a suitable position, the soldering iron 8 will drop down in connection with the revolution of the crank 5 so that the point of the iron will touch the can at the vent opening where the solder closure is to be placed. The soldering iron will in connection with the movement of the crank 5 move with the can in the direction indicated by the arrow in Fig. 2. At the time that the soldering iron drops down towards the can in connection with the revolution of the crank 5, it will come in contact with the end of the solder wire on its underside, the delivery end of the tube 20 being so positioned as to affect this result. As the can A passes along the trough after a short interval of contact with the soldering iron 8, the iron is lifted off and the crank 5 continues to turn over to bring the soldering iron again into operation. The soldering iron will for a time be out of contact with the end of the solder wire, but will usually carry at its point a drop of solder which is particularly available when the iron first descends on top of the can. As one can is passed through by the passing wheel 13, another one is received in the next succeeding recess and the relative size of the driving wheels for the soldering iron and solder feed is such that the soldering iron will come into operation on each can as it is presented.

To enable the position of the soldering iron to be adjusted laterally of the trough or guide way 2, through which the cans are passed, the arm of the crank 5 will preferably be made somewhat elongated and screw-threaded and provided with adjusting nuts 7ª and 7ᵇ.

It is evident that changes and modifications in and from the construction herein shown may be made without departing from the spirit of my invention.

What I claim as new and desire to secure by Letters Patent is:

1. In a soldering machine of the character described, the combination of means for continually moving the cans through the machine in a definite position at regular intervals, a soldering iron and heating mechanism, a crank from which the soldering iron and heating mechanism are suspended, and means for continually rotating the crank in unison with the can moving mechanism whereby the soldering iron is dropped on to the can as it passes, substantially as set forth.

2. The combination in a machine of the character described of a continually moving can passing mechanism, a continuous driven crank positioned transversely of and above the path of the cans in the passing mechanism, the soldering iron swinging from the crank and arranged to descend upon and move along to a limited extent with the can in the passing mechanism, substantially as set forth.

3. The combination in a vent soldering machine of the character described of a can guiding trough, a continually moving passing wheel, a crank positioned transversely of the trough above the same, and means for continually driving the crank, a soldering iron suspended and swinging from the crank and arranged to descend upon and move to a limited extent with each can as it is passed through the trough, substantially as set forth.

4. The combination in a soldering machine of the character described of mechanism for continually passing the cans along in a definite line, a continually rotating crank positioned transversely of and above the path of the cans, and a soldering iron swinging from said crank, and a solder feeding means arranged to direct wire solder into engagement with the soldering iron in its lower position, substantially as set forth.

5. The combination in a soldering machine of the character described, of a guideway through which the cans are adapted to be passed, the can passing wheel, a crank arranged transversely of and above the guideway, a soldering iron and heating means swinging from the crank, and means for driving the can passing wheel and the crank supporting the soldering iron continuously in the same direction, substantially as set forth.

6. The combination in a soldering machine of the character described, of a can passing wheel, a crank arranged above and transversely of the path of the cans at the passing wheel, a soldering iron and heating apparatus therefor suspended and swinging from the crank, and mechanism for continuously driving the can passing wheel and crank in the same direction and arranged to cause the soldering iron to descend on the top of each can and travel to a limited extent with the can, substantially as set forth.

In witness whereof, I have affixed my signature, in presence of two witnesses, this 23rd day of April 1906.

CHARLES ARTHUR CRANDALL.

Witnesses:
 EMMA S. HESSE,
 SARAH E. CLARK.